G. W. BROWN.
Animal-Trap.
No. 161,859. Patented April 13, 1875.
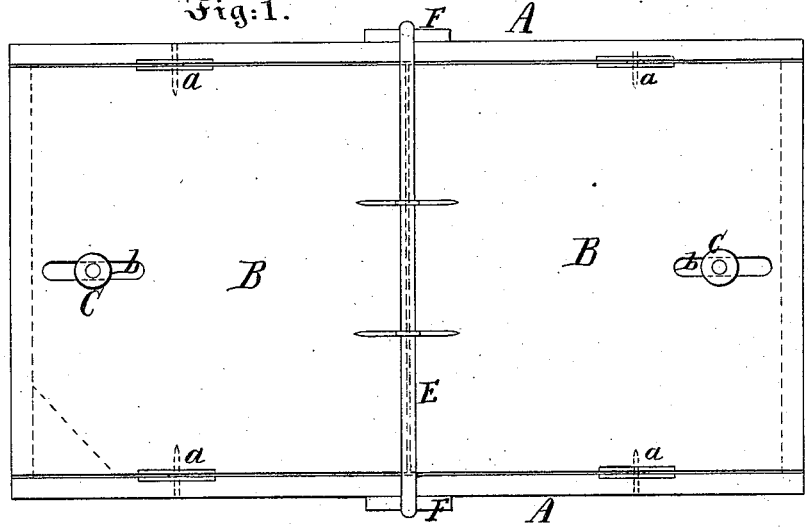
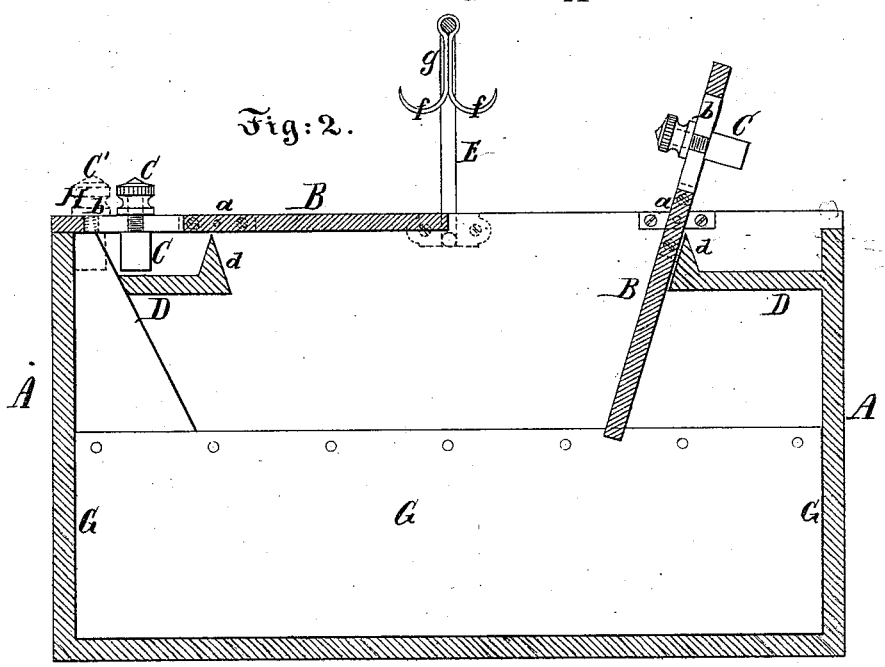
Witnesses:
M. A. Van Namee
Wm C. Dey
Inventor:
Geo W Brown
by his attorney T. L. Stetson

UNITED STATES PATENT OFFICE.

GEORGE W. BROWN, OF NEW YORK, N. Y.

IMPROVEMENT IN ANIMAL-TRAPS.

Specification forming part of Letters Patent No. 161,859, dated April 13, 1875; application filed March 22, 1875.

*To all whom it may concern:*

Be it known that I, GEORGE W. BROWN, of the city and State of New York, have invented certain Improvements in Rat-Traps, of which the following is a specification:

The invention relates to that class of traps in which the animals are admitted by falling through one or more doors in the top.

I construct the box of two carefully-balanced doors, which tend to stand in a horizontal position and cover the box; and I suspend the bait over the center by a peculiar bail fitted with hooks. The covers open downward in the center under the bait, and the force with which they tend to close may be delicately adjusted.

The movable pieces which adjust the balance of the doors, when set out to their farthest extreme, engage with the sides of the box, and prevent the doors from being opened at all while in such adjustment. A drain-passage is provided in the top of the box, so there need be no aperture of any kind in the bottom.

When the box is made of wood I line the interior to a considerable height with tinned iron, or other sheet metal, and continue such lining up in one corner to the drain-hole.

The following is a description of what I consider the best means of carrying out the invention.

The accompanying drawing forms a part of this specification, and designates the same parts by the same letters throughout.

Figure 1 is a view of the trap from above. Fig. 2 is a vertical section. Fig. 3 is a side view of a step or ear.

A is the box; B B, movable covers, pivoted at *a a*, and slotted at *b b*, to receive the compression-screws which hold the movable pieces C C, which serve both as weights and as locking-pieces. D D are fixed covers, with the faces *d d* so placed as to fit tightly when the movable covers are depressed. E is the bail, its arms stepping into holes *o* in the ears or steps F, and rigidly retained by springing into the grooves *e* and holes *o* in the ears F. The bait-hooks *f f* are formed with their shanks *g* springing together. They are applied by snapping over the bail E, and are sustained by slight notches filed in it. G is a tin lining, carried up to the drain-hole H.

When it is desired to kill the animals a quantity of water, or, better, brine, is placed in the bottom of the trap. I have found that the animals are almost immediately killed on being plunged into brine. When it is desired to keep them alive for any purpose the trap should be left dry; and, to insure the retention of the animals for any considerable period after their capture, the movable pieces C may be adjusted outward to the fullest extent, in which case they lock against the inner face of the box, and prevent the cover from being opened.

The bail E serves the double purpose of supporting the bait-hooks *g*, and of serving as a convenient handle to move the trap. It takes hold of the trap by its lower ends being turned inward and engaging in the holes *o*. When thus engaged the body of the bail a little above each hole *o* is received in the notch *e*, and is thus stiffly supported, so that it cannot be turned down like the bail of a water-pail, but is supported like the handle of a basket. Its elasticity allows it to be conveniently removed, when desired, by simply springing the lower ends outward.

For packing or transportation the bail and hooks may be placed inside.

I claim as my invention—

1. In combination with the body A and tilting covers B, the adjustable pieces C, adapted to not only regulate the balance of the covers, but also to lock them in the closed position, as herein specified.

2. In combination with the body A and tilting covers B, the stiff bail E, arranged to ship and unship in the holes *o o* and grooves *e e*, as and for the purposes specified.

3. The spring-hooks *f f*, their shanks *g* clasping the bail E, in combination with the box A, bail E, and hinged cover or covers B, as before described.

In testimony whereof I have hereunto set my hand this 1st day of March, 1875, in the presence of subscribing witnesses.

GEO. W. BROWN.

Witnesses:
   C. A. HINCKLEY,
   GEO. C. D. BRAND.